(12) United States Patent
Vaaben et al.

(10) Patent No.: US 9,305,269 B2
(45) Date of Patent: Apr. 5, 2016

(54) RELATIVE TRAJECTORY COST

(71) Applicant: The Boeing Company, Chicago, IL (US)

(72) Inventors: Bo Vaaben, Espergaerde (DK); Krzysztof Pytel, Gdansk (PL)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 14/081,275

(22) Filed: Nov. 15, 2013

(65) Prior Publication Data

US 2015/0142298 A1    May 21, 2015

(51) Int. Cl.
*G06Q 10/04* (2012.01)

(52) U.S. Cl.
CPC .................................. *G06Q 10/047* (2013.01)

(58) Field of Classification Search
CPC . G06Q 10/047; G08G 5/0013; G08G 5/0039; G08G 5/0043
USPC .......... 701/120, 122, 522, 528, 531, 533, 537
See application file for complete search history.

(56) References Cited

U.S. PATENT DOCUMENTS

| | | | | |
|---|---|---|---|---|
| 2004/0193362 | A1* | 9/2004 | Baiada et al. | 701/120 |
| 2013/0085661 | A1* | 4/2013 | Chan et al. | 701/122 |
| 2013/0184978 | A1* | 7/2013 | Subbu et al. | 701/120 |

OTHER PUBLICATIONS

Vaaben et al.; "Mitigation of Airspace Congestion Impact on Airline Networks"; DTU Management Engineering; Tech. Univ. of Denmark; Jan. 22, 2013; 27 pages.
Bo Vaaben; "Sustainable Disruption Management"; The Technical University of Denmark; Thesis; Dec. 3, 2012; 162 pages.
Bo Vaaben; "Mitigation of Airspace Congestion Impact on Airline Networks"; AGIFORS Airline Operations; Jeppesen, A Boeing Company; 2012; 17 pages.

* cited by examiner

*Primary Examiner* — Kim T Nguyen
(74) *Attorney, Agent, or Firm* — Baker & Hostetler LLP

(57) ABSTRACT

Methods and systems for determining routes in a Collaborative Trajectory Options Program (CTOP) enabled Air Traffic Management system are disclosed. A first trajectory with a lowest Network Cost and having an assumed ground delay is identified. A Relative Trajectory Cost of zero is assigned to the first trajectory. A second trajectory is identified and the assumed ground delay of the first trajectory is iteratively incremented until a Network Cost for the second trajectory is approximately equivalent to the Network Cost of the first trajectory. A Relative Trajectory Cost for the second trajectory is determined based at least in part on the iteratively incremented assumed ground delay of the first trajectory.

20 Claims, 9 Drawing Sheets

Flight ID – (Unique Flight Data)

| ACID | ORIG | DEST | IGTD | TYPE | ERTD |
|---|---|---|---|---|---|
| ABC123 | LAX | IAD | 05/1945 | B757 | 05/1957 |

Trajectory Option Set (TOS) – (TRAJ_OPTION)

| RTC | RMNT | TVST | TVET | Route | ALT | SPEED |
|---|---|---|---|---|---|---|
| 0 | | | | TRM PKE J96 SLN J24 MCI J80 VHP APE AIR J162 MGW GIBBZI | 350 | 435 |
| 30 | | | | TRM PKE DRK J96 GUP J8 BGD MMB PER SGF J98 FAM J78 IIU J78 HVQ GIBBZI | 350 | 435 |
| 50 | | 1745 | 1945 | TRM PKE DRK J6 IRW FSM MEM J42 BNA HVQ GIBBZI | 350 | 430 |
| 60 | | 1945 | 2145 | DAG J100 LAS J146 HBU DVV J60 JOT J146 WOOST J34 AIR J162 MGW GIBBZI | 350 | 425 |
| 70 | 45 | 2030 | 2200 | TRM BLH J169 TFD J50 SSO J4 EWM J66 ABI J4 FUZ UIM ELD SQS VUZ J14 CREWE J51 FAK BARNI | 310 | 430 |

ERTD – Earliest Runway Time of Departure
RTC – Relative Trajectory Cost
RMST – Required Minimum Notification Time   } Optional values provided by the Flight Operator
TVST – Trajectory Valid Start Time
TVET – Trajectory Valid End Time

FIG. 2

RELATIVE TRAJECTORY COST

BACKGROUND

As air traffic and the number of airline flights continue to grow, congestion and delays are becoming an increasing concern. When new programs are implemented to alleviate congestion and delays, airlines must determine how to participate in the programs while maintaining the airlines' operational efficiencies.

SUMMARY

Illustrative examples of the present disclosure include, without limitation, a method, device, and computer-readable storage medium. In one aspect, a method for determining routes in a Collaborative Trajectory Options Program (CTOP) enabled Air Traffic Management system is described. A first trajectory with a lowest Network Cost and having an assumed ground delay is identified. A Relative Trajectory Cost of zero is assigned to the first trajectory. A second trajectory is identified and the assumed ground delay of the first trajectory is iteratively incremented until a Network Cost for the first trajectory, including the assumed ground delay, is approximately equivalent to the Network Cost of the second trajectory. A Relative Trajectory Cost for the second trajectory is determined based at least in part on the iteratively incremented assumed ground delay, which was added to the first trajectory in order to make the Network Cost of the two trajectories approximately equivalent.

In another aspect, a device configured to determine routes in a Collaborative Trajectory Options Program (CTOP) enabled Air Traffic Management system is provided. The device may include a processor and memory. A first route is determined and a first network cost and ground delay associated with the first route are determined A relative trajectory cost is assigned to the first route. A second route is identified and the ground delay for the first route is iteratively incremented until a second network cost associated with the second trajectory is approximately equivalent to the first network cost. A relative trajectory cost for the second trajectory is determined based at least in part on the iteratively incremented ground delay for the first route.

In another aspect, a computer-readable storage medium is provided. One or more trajectories for a given departure/destination are identified. Relative trajectory costs for the one or more trajectories are determined based at least in part on associated network costs and assumed ground delays. An ordered list of the one or more trajectories is determined based on the determined relative trajectory costs.

Other features of the disclosure are described below. The features, functions, and advantages that have been discussed can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations:

FIG. 2 depicts an example of a TOS message;

DETAILED DESCRIPTION

Congestion and uncontrollable events such as adverse weather often cause significant delays to commercial airplane flights. If a constraint such as adverse weather is in the airspace along a flight route and an airline has only one flight plan filed that takes a flight through that constraint, then the only option for that flight is to accept a ground delay or manually cancel and re-file a flight plan that takes the flight outside the constraint. A prolonged ground hold may lead to delay propagation, passenger misconnections and crew misconnections, and different trajectories having different fuel burn costs.

Figure 3:
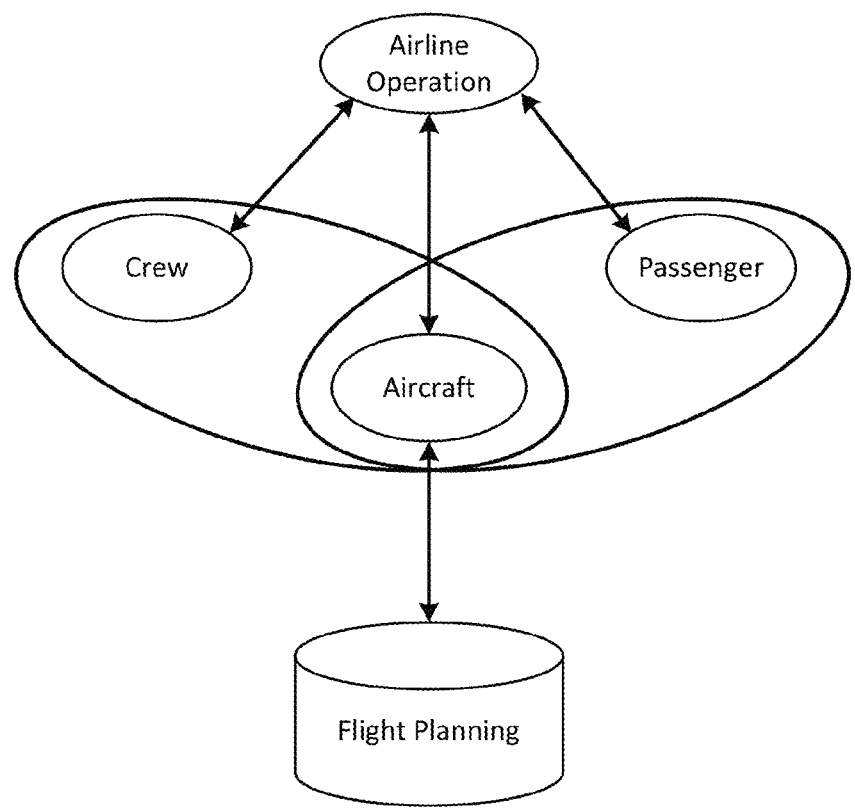
FIG. 3 depicts elements of a CTOP system.

The Federal Aviation Administration (FAA) is planning to implement a new traffic management initiative referred to as the Collaborative Trajectory Options Program (CTOP) to better balance demand with capacity and manage the constrained airspace resource in specific areas. Under the CTOP program, an airline may submit trajectory options that the airline is willing to be assigned for a given flight. Each trajectory option may be submitted along with a Relative Trajectory Cost (RTC) value indicating how many minutes the airline is willing to hold on the ground on its most preferred trajectory compared to a secondary trajectory option. However, one problem is that airlines may not have the capability or may otherwise have difficulties determining the most advantageous route preferences and comparing one trajectory to another trajectory. Consequently it may be difficult for an airline to translate their operational impacts into a single number of minutes as the RTC value currently requires. This disclosure describes a method for calculating the full operational impact of the RTC values and thus ensuring that the most beneficial trajectory priorities from the airline point of view are communicated to Air Traffic Management (ATM). The present disclosure describes methods for determining preferred trajectory options by taking into account operational impacts such as fuel burn, schedule, passengers, and crew, as illustrated in FIG. 3.

Under the CTOP program, operators submit alternative routes of their choice around or away from a constraint, thus providing additional options for air traffic controllers to expedite flights away from congested airspace. Such options may be submitted as a trajectory option set (TOS). Flights that have submitted a trajectory option set may be exempt from ground delays or in-flight reroutes associated with such constraints. If an airline is participating in the CTOP program and has submitted a TOS with multiple route options that the airline would be willing to consider to fly around a constraint, re-routing may be performed automatically. For example, when a constraint is identified, a flight may be automatically be placed on a route that the airline has pre-selected to avoid the constraint.

Figure 1:
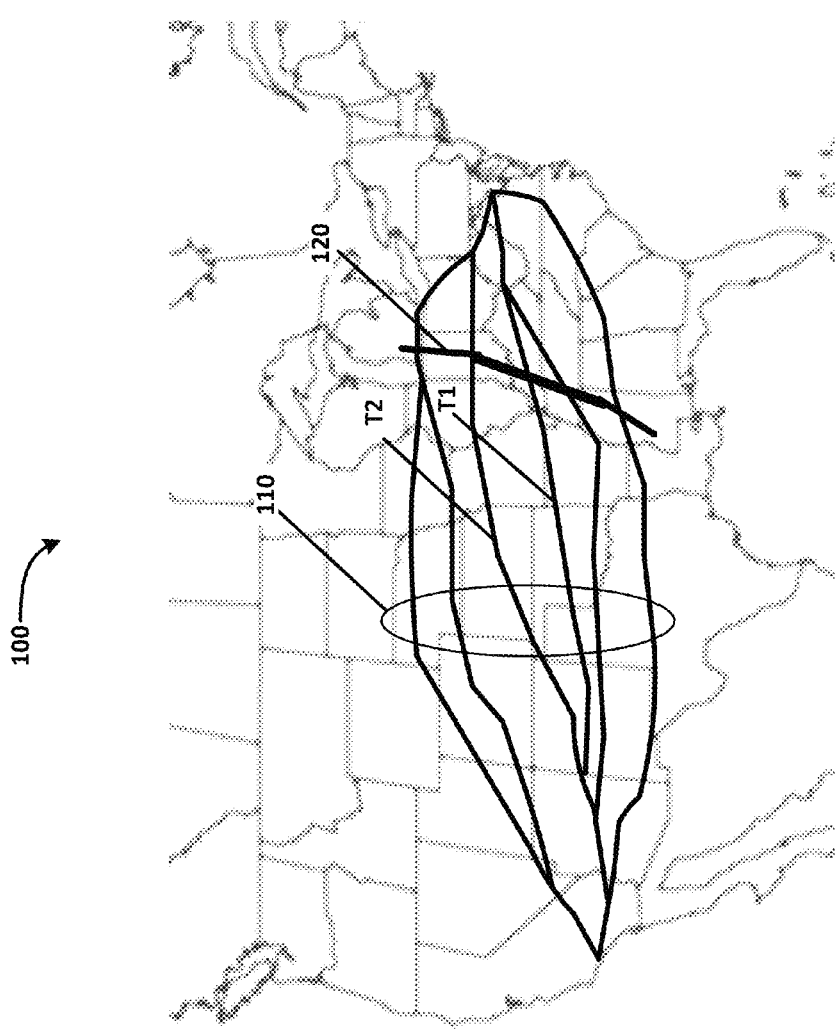
FIG. 1 depicts an example set of trajectories on a route map.

Referring to FIG. 1, illustrated is a flight route map 100 including a constraint 120. Under the CTOP program, airlines may submit various trajectory options 110 which the airlines are willing to accept for a given flight (e.g., departure/destination pair). These trajectories are expressed as a TOS. A message describing the TOS may be sent to ATM for flights affected by the constraint. One example of the contents of a TOS message is shown in FIG. 2. The Relative Trajectory Cost (RTC) is shown in the leftmost column of FIG. 2. In this example, the most preferred trajectory has an RTC value of zero. The second preferred option has an RTC value of 30. These RTC values express to ATM that in case the most preferred trajectory is associated with a ground hold of at least 30 minutes while the second trajectory currently has no ground hold, then the second trajectory will be awarded to the airline. More specifically, ATM will sum the RTC value for each trajectory with the required ground hold for the trajectory. This sum may be denoted as S. The flight will be assigned the trajectory which has the lowest S value.

Figure 4:
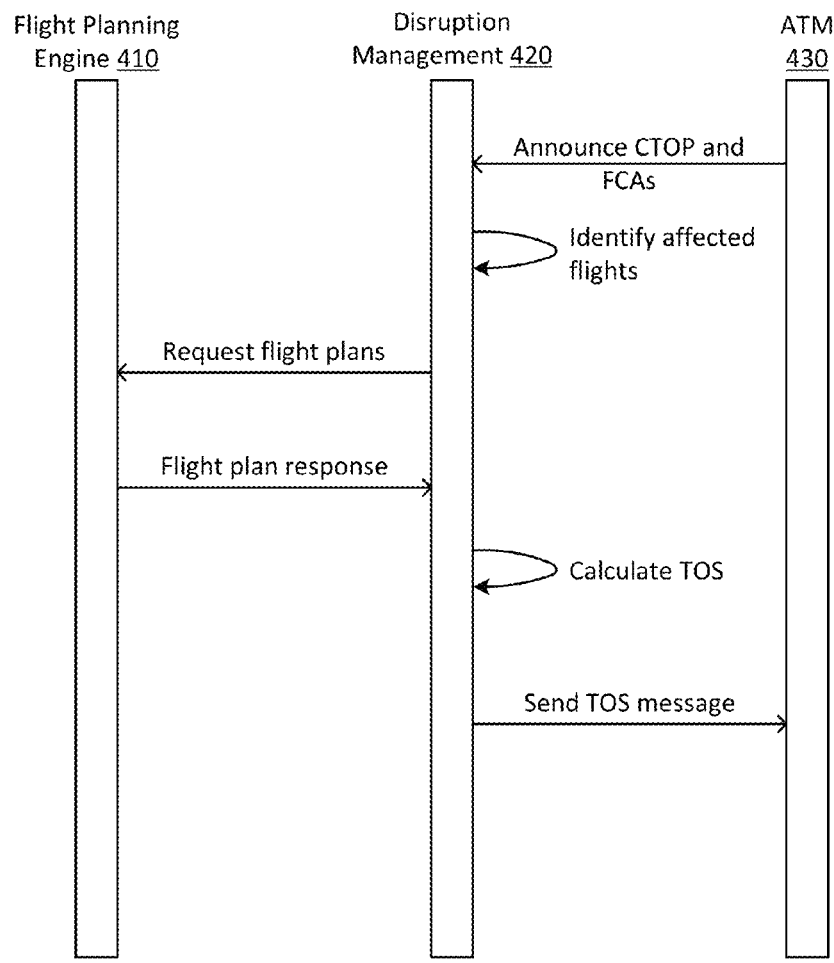
FIG. 4 depicts flows in a CTOP system.
Figure 5:
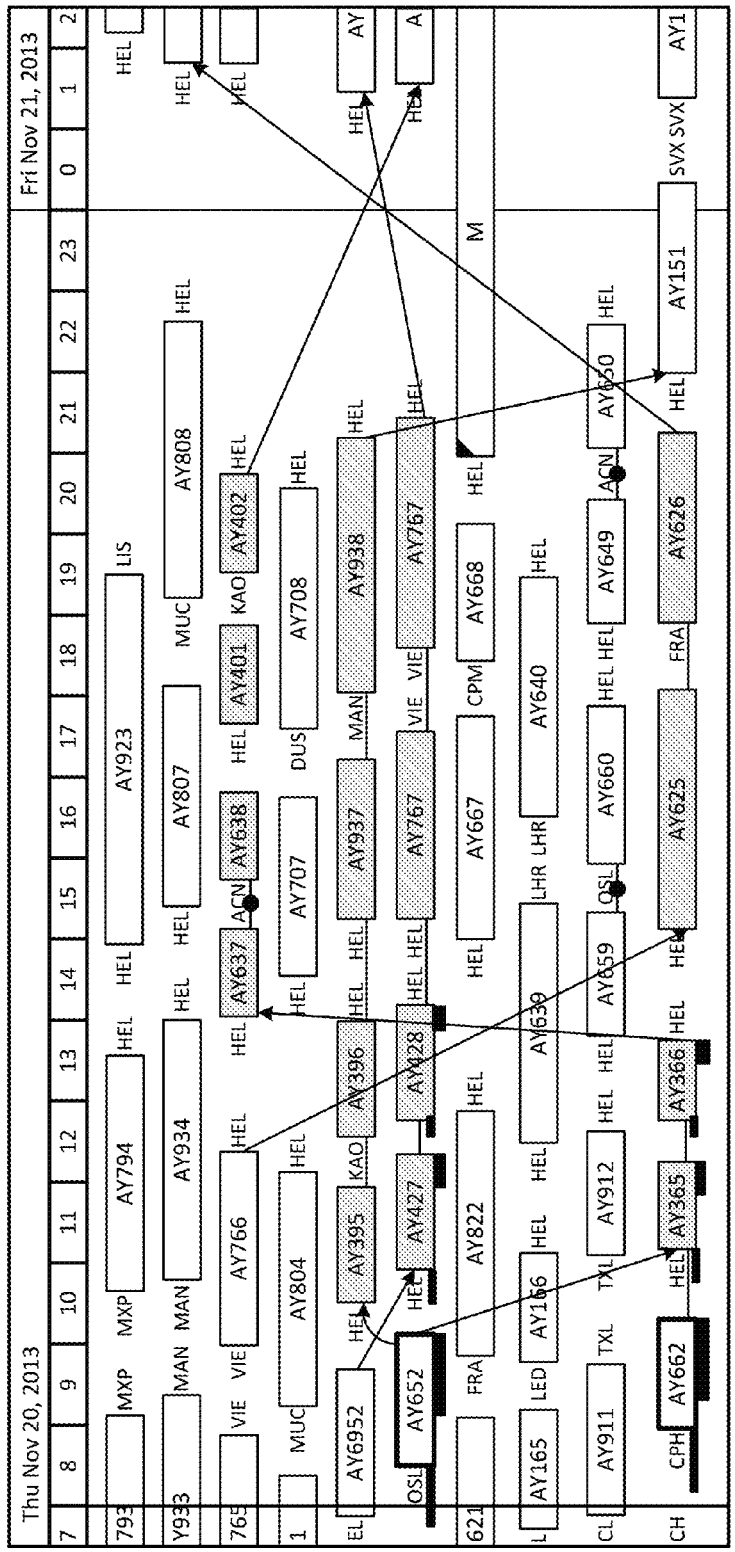
FIG. 5 depicts an example user interface that may be used in conjunction with a CTOP system.

In one example illustrated in FIG. 4, the disclosed method may be implemented in a system that includes a disruption management function 420 and a flight planning engine 410. The disruption management function 420 and flight planning engine 410 may have access to operational information regarding flight schedule, crew, passengers and flight trajectories. The disruption management function 420 may be configured to determine an optimal combination of recovery actions in order to recover from an operational disruption to the flight schedule. Together with the recovery determination, a Network Cost may be provided based on the current state of the network. This Network Cost may include the cost of recovering disrupted passengers, recovering crew, and recovering aircraft. This may be further illustrated in FIG. 5. The Network Cost may also be referred to as Extended Network Cost in some implementations.

In some example implementations, the disruption management function 420 and flight planning engine 410 may also be configured to determine an optimal selection of flight trajectories from a network point of view. The disruption management function 420 and flight planning engine 410 may be configured to ensure that flight trajectories are not only determined from the operation of a single flight, but rather from the optimal operation of the entire airline network. The disruption management function 420 and flight planning engine 410 may, for example take fuel and congested air sectors into account. The disruption management function 420 and flight planning engine 410 may also be configured to calculate an Extended Network Cost (ENC), which takes passenger impact, trajectories and fuel into account, as shown below in one example.

Minimize:

$$\sum_{f \in F} \sum_{k \in C_f} c_f^k x_c^k + \sum_{f \in F} c_f z_f + \sum_{p \in \mathcal{P}} \overline{c}_p n_p \mathcal{A}_p$$

Subject to:

$$\sum_{k \in C_f} x_f^k + z_f = 1 \qquad \forall f \in F$$

$$\forall f \in F$$

$$\sum_{g \in N_n^-} y_g + \sum_{(f,k) \in N_n^-} x_f^k +$$

$$s^n = \sum_{g \in N_n^+} y_g + \sum_{(f,k) \in N_n^+} x_f^k \qquad \forall n \in \mathcal{N}, \forall a \in A$$

$$x_{IT(p,l)}^k + \sum_{m \in MC(p,IT(p,l),k)} x_{IT(p,l+1)}^m - \lambda_p \leq 1 \qquad \forall k \in C_{IT(p,l)}$$

$$\forall l \in 1, \ldots, |IT(p)| - 1,$$
$$\forall p \in \mathcal{P}$$

$$\mathcal{A}_p \geq z_f \qquad \forall f \in IT(p), \forall p \in \mathcal{P}$$

$$\sum_{f \in F} \sum_{k \in C_f} d_{fb}^k x_f^k \leq 1 \qquad \forall b \in B$$

$$x_f^k \in 0, 1 \qquad \forall k \in C_f, \forall f \in F$$

$$z_f \in 0, 1 \qquad \forall f \in F$$

$$\lambda_p \in 0, 1 \qquad \forall p \in \mathcal{P}$$

$$y_g \geq 0 \qquad \forall g \in G$$

Aspects of the disruption management function 420 and flight planning engine 410 are further described in Bo Vaaben, "Sustainable Disruption Management," *The Technical University of Denmark*, 2012, ISBN: 978-87-92706-03-4, hereby incorporated by reference in its entirety.

In one example implementation, the Extended Network Cost may be used to calculate the RTC values using the following process.

The lowest cost trajectory A in a TOS, which may in one example have the lowest fuel burn, is assigned RTC=0 and the Extended Network Cost is calculated. This is denoted ENC (A,d), where d is the assumed ground delay associated with this trajectory.

The RTC of a second trajectory option B is calculated by letting the ground hold of trajectory A increase incrementally until ENC(A,d)≈ENC(B,0).

For example, referring to the example shown in FIG. 1, the TOS includes six trajectories. In this example, two trajectories marked T1 and T2 are considered. The lowest cost trajectory with the lowest fuel burn is trajectory T1, which is assigned RTC=0. Other trajectories will have their RTC values calculated relative to this trajectory. It is noted that trajectory T1 traverses the most capacitated part of the Flow Control Area (FCA), which is marked as the thicker line of constraint 120 in FIG. 1. The most capacitated part of the Flow Control Area is likely to apply ground holding for this trajectory. The Extended Network Cost for trajectory T1 is, however, initially calculated using the assumption of zero ground holding. Following the notation from above we denote this as ENC(T1,0).

Next, the RTC value for trajectory T2 is calculated, which is calculated using the method described above. Initially ENC (T2,0) is calculated. Assuming an incremental ground hold step of 5 minutes, the following values may be calculated:

ENC(T1,5), ENC(T1,10), . . . , ENC(T1,x). The incremental ground hold value may be varied.

The values may be calculated until ENC(T1,xx)≈ENC(T2, 0). The x value is now the calculated RTC for T2.

Using the above procedure, the RTC values may be calculated to take into account the entire network operation impact of choosing one trajectory over another for a CTOP flight.

Figure 6:
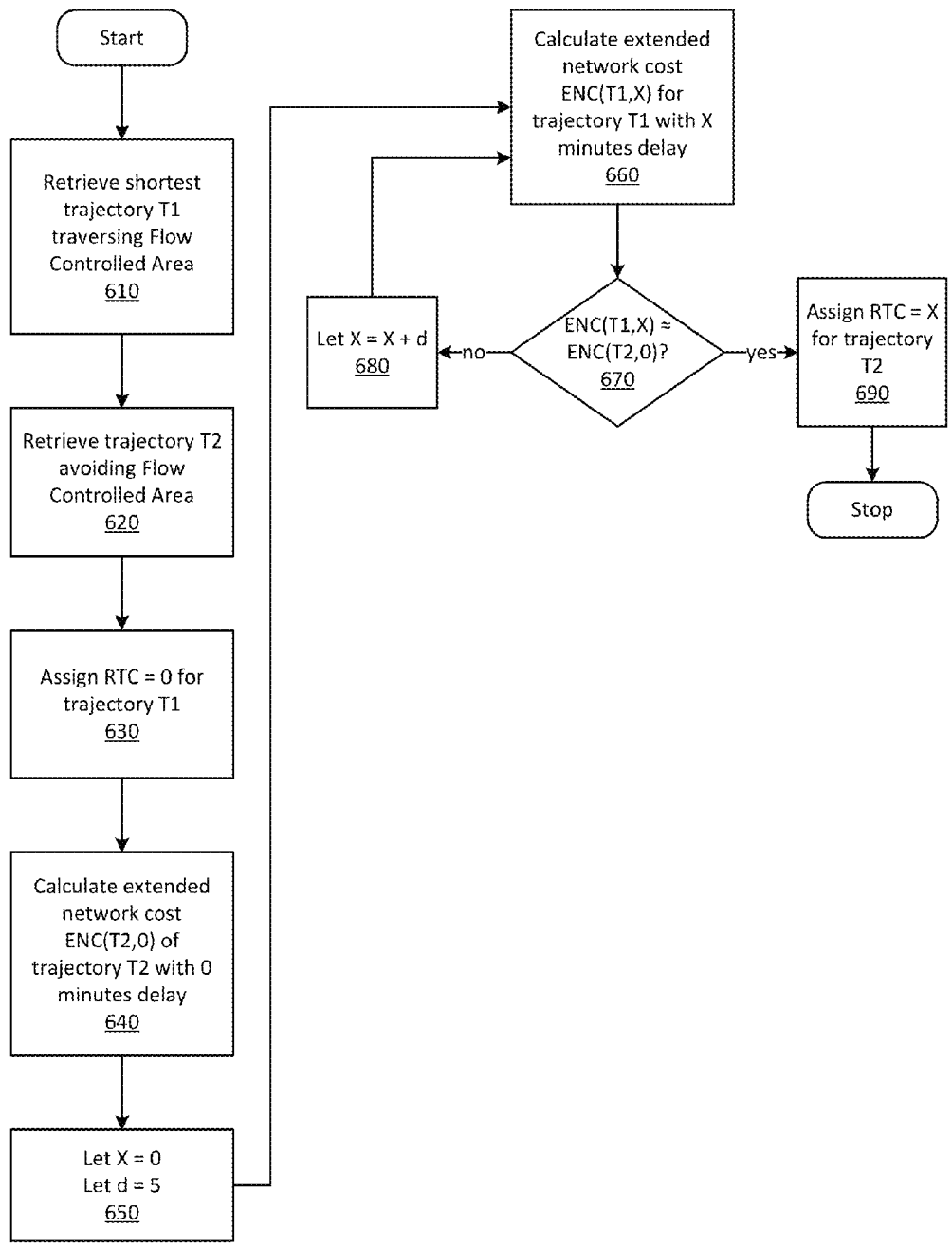
FIG. 6 depicts an example procedure that may be used in conjunction with a CTOP system.

FIG. 6 illustrates an example implementation of the method disclosed herein. Operation 610 illustrates retrieving the shortest trajectory T1, which may for example have the lowest fuel burn. Operation 620 illustrates retrieving a trajectory T2 that avoids the Flow Controlled Area.

Operation 630 illustrates assigning trajectory T1 with RTC=0. Operation 640 illustrates calculating the Extended Network Cost for trajectory T2, assuming no ground delay. This may be denoted ENC(T1,d), where d is the assumed ground delay associated with this trajectory. The RTC of the second trajectory option T2 may be calculated by letting the ground hold of trajectory T1 increase incrementally until the ENC(T1,d)≈ENC(T2,0).

Operation 650 illustrates that X is the current delay, where d denotes the incremental ground hold. In this example, an incremental ground hold step of 5 minutes is used. It should be understood that the incremental ground hold step d can be other values of time or other unit as appropriate. The RTC value for trajectory T2 may be calculated using the method described above. ENC(T1,X) for trajectory T1 with X minutes delay is calculated in operation 660. Operation 670 illustrates determining if ENC(T1,X)≈ENC(T2,0). If the values are not approximately equivalent, then operation 670 may be followed by operation 680. Operation 680 illustrates incrementing X by the incremental ground hold of 5 minutes, and operation 680 may be followed by operation 660. If the values are approximately equivalent, then operation 670 may be followed by operation 690. Operation 690 illustrates assigning X as the calculated RTC for T2.

Figure 7:
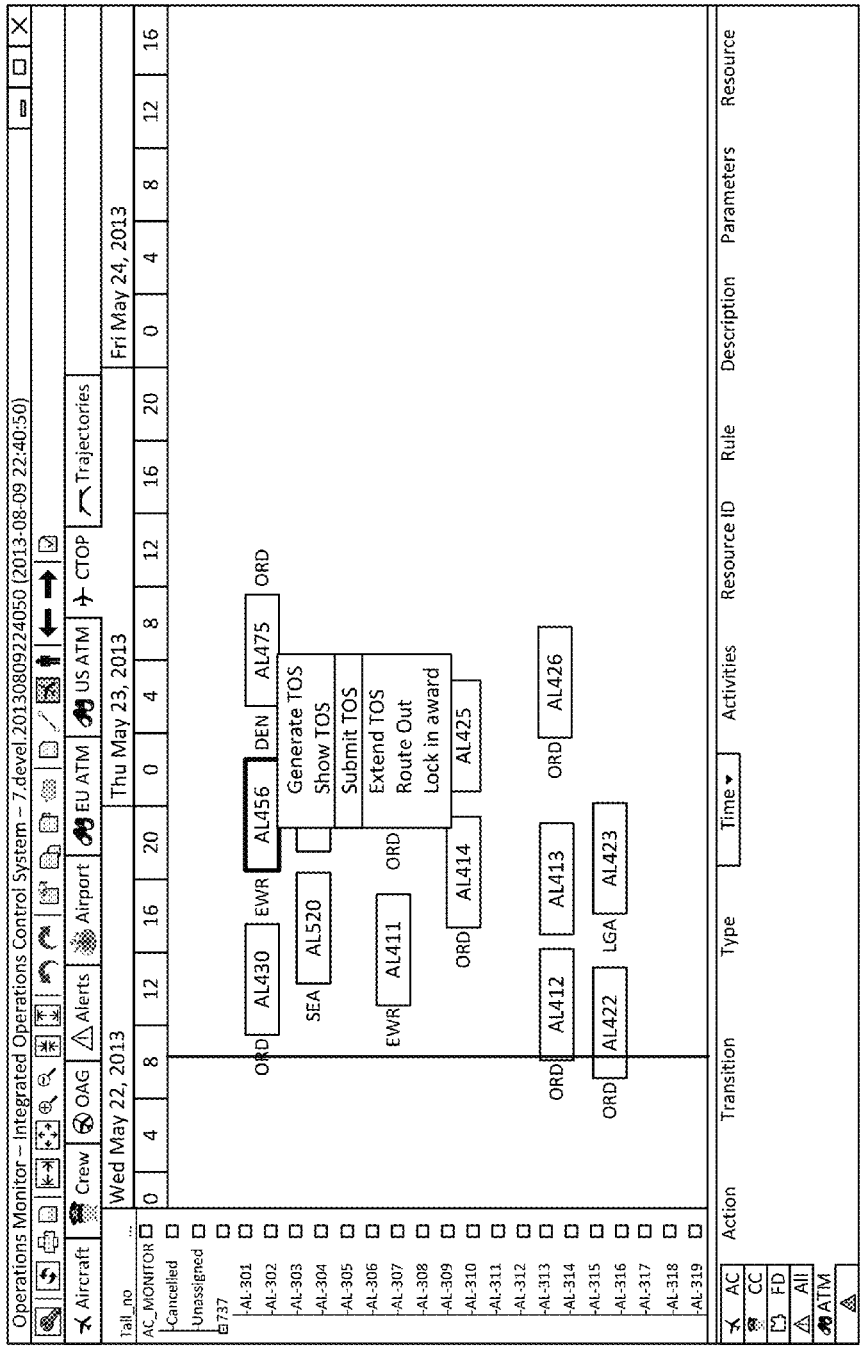
FIG. 7 depicts an example user interface that may be used in conjunction with a CTOP system.

A user can be provided a user interface for viewing and managing routes in a Collaborative Trajectory Options Program (CTOP) enabled Air Traffic Management system. For example, the user may be able to access a user interface, such as the one shown in FIG. 7. In one example, a user may utilize a user interface presented by disruption management function 420 and flight planning engine 410 of FIG. 4 to create or view routes and other TOS information. The fields shown in FIG. 7 are provided to illustrate examples of possible user interface options that may be provided to a user. As further described herein, additional fields may be provided, and some of the fields may be optional.

The various examples used in this disclosure are described in the context of aircraft flight operations, but it should be understood that the described principles may be applied to any operational scenario where route or trajectory sets are generated and sent to a controlling authority. Such examples in the field of transportation include airline, train, and cruise ship operations. The described principles may also be implemented in other fields.

Figure 8:
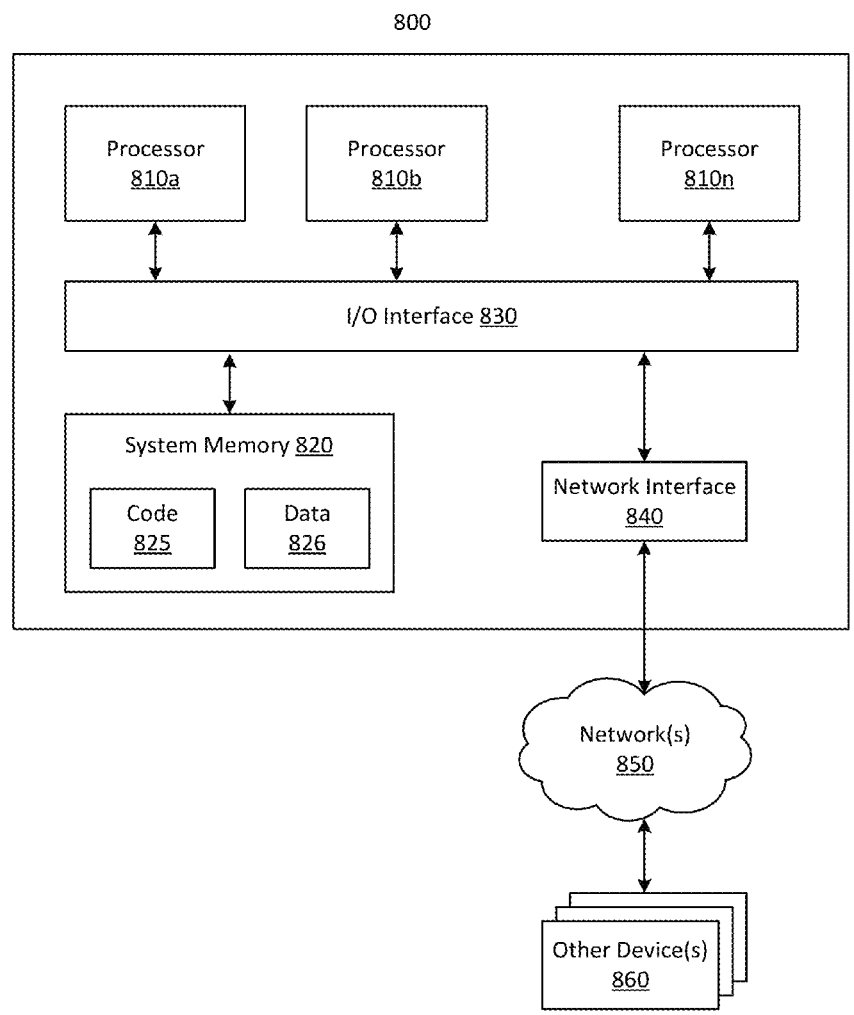
FIG. 8 is a diagram illustrating an example computing system that may be used in some examples.

In at least some embodiments, a computing device that implements a portion or all of one or more of the technologies described herein, including techniques for determining routes in a Collaborative Trajectory Options Program (CTOP) enabled Air Traffic Management system, may include a general purpose computer system that includes or is configured to access one or more computer-accessible media. FIG. 8 illustrates such a general purpose computing device 800. In the illustrated embodiment, computing device 800 includes one or more processors 810a, 810b and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general purpose or embedded processors implementing any of a variety of instruction set architectures (ISAs), such as the x86, PowerPC, SPARC, or MIPS ISAs or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices as illustrated in FIGS. 1 through 8, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described herein for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special purpose computer systems, in addition to or instead of being implemented using general purpose computer systems. The term "computing device," as used herein, refers to at least all these types of devices and is not limited to these types of devices.

Figure 9:
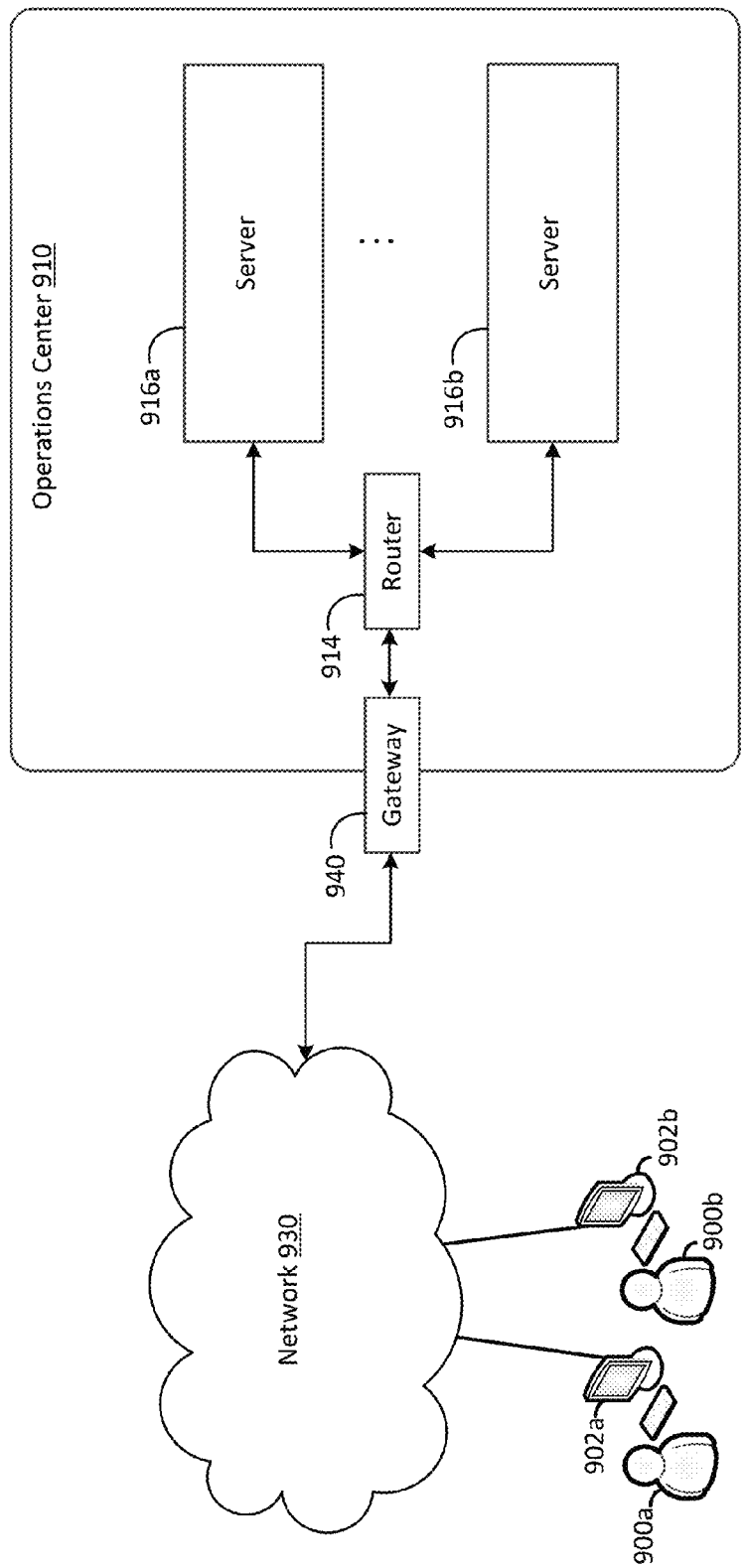
FIG. 9 is a diagram illustrating an example computing system that may be used in some examples.

FIG. 9 illustrates an example computing environment in which the embodiments described herein may be implemented. FIG. 9 is a diagram schematically illustrating an example of an operations center 910, such as an airline operations center or an operations center associated with ATM. The operations center 910 may be accessible by users 900a and 900b (which may be referred herein singularly as "a user 900" or in the plural as "the users 900") via user computers 902a and 902b (which may be referred herein singularly as "a computer 902" or in the plural as "the computers 902") via a network 930.

Operations center 910 may include servers 916a and 916b (which may be referred herein singularly as "a server 916" or in the plural as "the servers 916") that provide computing resources. Other resources that may be provided include data storage resources (not shown).

Network 930 may, for example, be a publicly accessible network of linked networks and possibly operated by various distinct parties, such as the Internet. In other embodiments, network 930 may be a private network, such as, for example, a corporate network that is wholly or partially inaccessible to non-privileged users. In still other embodiments, communications network 930 may include one or more private networks with access to and/or from the Internet.

Network 930 may provide access to computers 902. Computers 902 may be computers utilized by users 900. For instance, user computer 902a or 902b may be a server, a desktop or laptop personal computer, a tablet computer, a wireless telephone, a personal digital assistant (PDA), an e-book reader, a game console, a set-top box or any other computing device capable of accessing operations center 910. User computer 902a or 902b may connect directly to the Internet (e.g., via a cable modem or a Digital Subscriber Line (DSL)). Although only two user computers 902a and 902b are depicted, it should be appreciated that there may be multiple user computers.

Computers 902 may also be utilized to access the computing resources provided by operations center 910. In this regard, operations center 910 might provide a Web interface through which aspects of its operation may be accessed through the use of a Web browser application program executing on user computer 902. Alternatively, a stand-alone application program executing on user computer 902 might access an application programming interface (API) exposed by operations center 910 for accessing the resources. Other mechanisms for accessing the resources of the operations center 910, including deploying updates to an application, might also be utilized.

Servers 916a and 916b (which may be referred herein singularly as "a server 916" or in the plural as "the servers 916") shown in FIG. 9 may be standard servers configured appropriately for providing the computing resources described above and may provide computing resources for executing one or more applications.

In the example operations center 910 shown in FIG. 9, a router 914 may be utilized to interconnect the servers 916a and 916b. Router 914 may also be connected to gateway 940, which is connected to network 930. Router 914 may manage communications within networks in operations center 910, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that operations center 910 described in FIG. 9 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, Internet appliances, and various other products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will be appreciated that, while various items are illustrated as being stored in memory or on storage while being used, these items or portions of them may be transferred between memory and other storage devices. Alternatively, in other examples some or all of the software modules and/or systems may execute in memory on another device and communicate with the illustrated computing systems via inter-computer communication. In some examples, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A method for determining routes in a Collaborative Trajectory Options Program (CTOP) enabled Air Traffic Management system, the method comprising:
    identifying, by a computer comprising a processor and memory, a first trajectory with a lowest Network Cost and having an assumed ground delay;
    assigning, by the computer, a Relative Trajectory Cost of zero to the first trajectory;
    identifying, by the computer, a second trajectory;
    iteratively incrementing, by the computer, the assumed ground delay for the first trajectory until a Network Cost for the first trajectory including the assumed ground delay is approximately equivalent to a Network Cost for the second trajectory; and
    determining, by the computer, a Relative Trajectory Cost for the second trajectory based at least in part on the iteratively incremented assumed ground delay for the first trajectory.

2. The method of claim 1, further comprising transmitting, by the computer, the first and second trajectories and their respective Relative Trajectory Costs to the Air Traffic Management system.

3. The method of claim 2, wherein the trajectories are transmitted as a trajectory option set.

4. The method of claim 1, further comprising determining, by the computer, additional Relative Trajectory Costs for additional trajectories.

5. The method of claim 1, further comprising receiving, by the computer, an indication of a constraint from the Air Traffic Management system.

6. The method of claim 1, wherein the Relative Trajectory Cost is indicative of a number of minutes of ground hold time of a preferred trajectory compared to a secondary trajectory.

7. The method of claim 1, wherein the Network Costs for the first and second trajectories are determined based at least in part on a current state of an operational flight network.

8. The method of claim 7, wherein the Network Costs for the first and second trajectories are determined based at least in part on fuel burn, schedule, passengers, or crew impacts, or a combination thereof.

9. The method of claim 7, wherein the incremented assumed ground delay is an incremental number of minutes.

10. The method of claim 1, wherein the incremented assumed ground delay is an incremental number of minutes.

11. The method of claim 1, further comprising receiving, by the computer, an indication of an assigned trajectory from the Air Traffic Management system, the assigned trajectory being one of the trajectories transmitted to the Air Traffic Management system.

12. A computing device configured to determine routes in a Collaborative Trajectory Options Program (CTOP) enabled Air Traffic Management system, the device comprising at least a processor and memory, the memory having stored thereon computer executable instructions that, when executed by the at least one processor, cause the device to at least:

identify a first route and determine a first network cost and ground delay associated with the first route;

assign a relative trajectory cost to the first route;

identify a second route;

iteratively increment the ground delay of the first route until a second network cost associated with the second route is approximately equivalent to the first network cost; and determine a relative trajectory cost for the second route based at least in part on the iteratively incremented ground delay of the first route.

13. The device of claim 12, further comprising determination of additional relative trajectory costs for additional routes.

14. The device of claim 13, further comprising transmission of routes and their respective relative trajectory costs to the Air Traffic Management system.

15. The device of claim 14, wherein the routes are transmitted as a trajectory option set.

16. The device of claim 12, wherein the relative trajectory costs of the first and second routes are indicative of a ground hold time of a preferred route compared to a secondary route.

17. The device of claim 12, wherein the costs of the first and second routes are determined based at least in part on operational impacts of the associated ground delay.

18. A non-transitory computer-readable medium having computer-readable instructions stored thereon, the computer-readable instructions comprising instructions that upon execution on a computing system, at least cause:

identifying a first trajectory with a lowest Network Cost and having an assumed ground delay;

assigning a Relative Trajectory Cost of zero to the first trajectory;

identifying a second trajectory;

iteratively incrementing the assumed ground delay for the first trajectory until a Network Cost for the first trajectory including the assumed ground delay is approximately equivalent to a Network Cost for the second trajectory; and determining a Relative Trajectory Cost for the second trajectory based at least in part on the iteratively incremented assumed ground delay for the first trajectory.

19. The non-transitory computer-readable medium of claim 18, further comprising instructions that upon execution on the computing system, at least cause transmitting the first and second trajectories and their respective Relative Trajectory Costs to an Air Traffic Management system.

20. The non-transitory computer-readable medium of claim 18, further comprising instructions that upon execution on the computing system, at least cause determining additional Relative Trajectory Costs for additional trajectories.

* * * * *